(12) United States Patent
Stewart

(10) Patent No.: US 6,348,154 B1
(45) Date of Patent: Feb. 19, 2002

(54) METHODS TO REMOVE METALS FROM WATER

(76) Inventor: David R. Stewart, 2406 Rollingwood Dr., Fort Collins, CO (US) 80524

(*) Notice: Subject to any disclaimer, the term of this patent is extended or adjusted under 35 U.S.C. 154(b) by 0 days.

(21) Appl. No.: 09/001,267

(22) Filed: Dec. 31, 1997

Related U.S. Application Data

(60) Provisional application No. 60/034,700, filed on Jan. 3, 1997.

(51) Int. Cl.$^7$ .......................... B01D 61/00; C02F 1/58; C02F 9/00
(52) U.S. Cl. ...................... 210/653; 210/684; 210/688; 210/724; 210/739; 210/749; 210/791; 210/805
(58) Field of Search ................. 210/688, 639, 210/649, 791, 806, 321.69, 411, 650–651, 653, 739, 143, 723–725, 912–913, 684, 749, 805

(56) References Cited

U.S. PATENT DOCUMENTS

| 4,465,597 | A | * | 8/1984 | Herman ...................... 210/713 |
| 5,045,213 | A | * | 9/1991 | Bowers ...................... 210/709 |
| 5,252,218 | A | * | 10/1993 | Muraldihara et al. ....... 210/636 |
| 5,266,203 | A | * | 11/1993 | Mukhopadhyay et al. .. 210/638 |
| 5,310,486 | A | * | 5/1994 | Green et al. ................ 210/638 |
| 5,336,475 | A | * | 8/1994 | Jackson |
| 5,403,490 | A | * | 4/1995 | Desai ......................... 210/652 |
| 5,415,775 | A | * | 5/1995 | Castillon et al. ............ 210/490 |
| 5,494,585 | A | * | 2/1996 | Cox ........................... 210/748 |
| 5,501,798 | A | * | 3/1996 | Al-Samadi et al. ......... 210/652 |
| 5,510,040 | A |   | 4/1996 | Miller et al. ................ 210/721 |
| 5,518,624 | A | * | 5/1996 | Filson et al. ................ 210/651 |
| 5,527,466 | A | * | 6/1996 | Li et al. ...................... 210/636 |

* cited by examiner

Primary Examiner—Matthew O. Savage
Assistant Examiner—Marianne Ocampo
(74) Attorney, Agent, or Firm—Merchant & Gould P.C.

(57) ABSTRACT

The present invention provides methods to remove metals from water in a cost effective and efficient manner using an inorganic cross-flow filter.

36 Claims, 2 Drawing Sheets

METHODS TO REMOVE METALS FROM WATER

This application claims benefit of U.S. Provisional application No. 60/034,700 filed on Jan. 3, 1997.

BACKGROUND OF THE INVENTION

Water which contains undesired metals can exist as a result of many natural and man-made processes. For instance, mines (active and abandoned), chemical and metal finishing plants, photography and electronic device process plants and municipal water non-point source pollution are all sources of metal-containing water.

Prior to the present invention, the undesired metals were removed using either clarifier systems, ion exchange resins, polymeric membranes or electric semi-permeable membranes. The effectiveness of the clarifier system for removal of metals was highly variable and costly. The ion exchange resins or polymeric membrane systems were less variable but usually were more costly. This cost usually increased with time due to resin and/or membrane replacement.

In all systems except ion exchange, metals have been removed from water by essentially two conceptual steps:
 a. chemical treatment (pH adjustment) followed by a
 b. mechanical separation (filter or sedimentation)

In the present system, the two conceptual steps are also followed, with the improvement being decreased 10-year cost and high 10-year metal removal efficiency average. The system uses a chemical treatment stage (pH adjustment) and a mechanical separation (filter). The filter used, however, is one which was not originally designed for use in metal separation.

Previous to the present invention, inorganic cross-flow filters were used to separate organic solids from liquids in such areas a food processing juice clarification, fermentation filtration, etc.) and concentration of solids in uranium processing. In none of the previous uses of filtration were the particular uses or parameters for use described as they are in the present application.

SUMMARY OF THE INVENTION

It is therefore an object of the present invention to provide a method to remove metals from water in a cost effective and efficient manner using an inorganic cross-flow filter.

It is a further object to provide a method to purify metal-containing water using improved methods.

Definitions

For the purposes of the present invention, the following words and phrases shall have the meanings as set forth below:

"Elemental membrane" shall mean a membrane for an inorganic filter comprising alumina or zirconia.

DETAILED DESCRIPTION OF THE INVENTION

The present invention provides methods for removing metals from water, comprising passing metal-containing water through an inorganic cross-flow filter. The filter used is preferably a ceramic filter. In a specific embodiment, the ceramic filter further comprises an elemental membrane.

The elemental membrane may have an average pore size of 0.05 $\mu$m to 10 $\mu$m, although the average pore size is preferably from 0.2 $\mu$m to 5 $\mu$m. Most preferred is a method wherein the elemental membrane has an average pore size from 0.2 $\mu$m to 0.3 $\mu$m.

Figure 1:
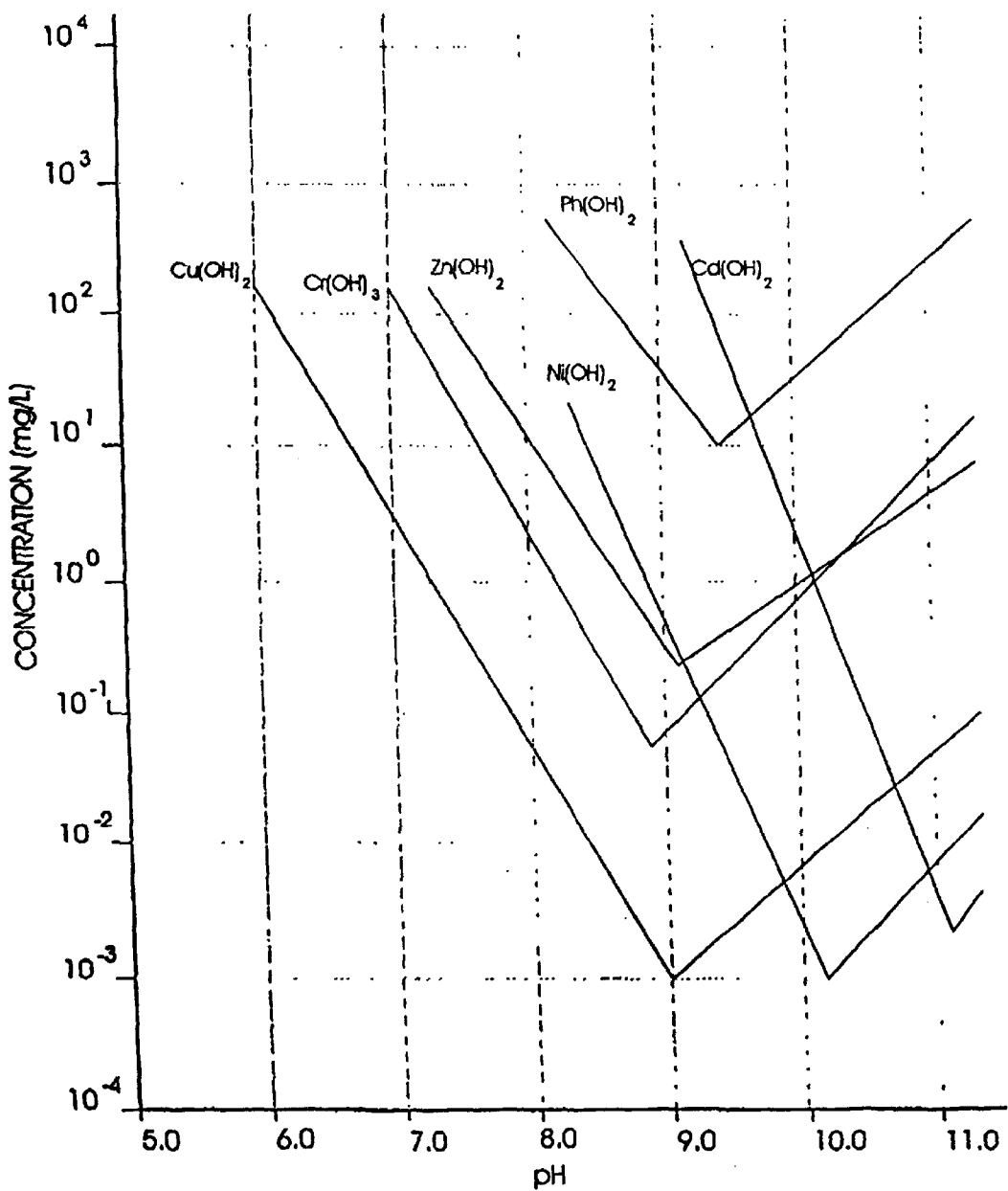
FIG. 1 is description of optimum pH ranges for precipitation of various metals.

The metal-containing water may be at a pH of 6 to 12.0, however, a method wherein the metal containing water is at a pH of 8.0 to 10 is preferred. Most preferred is a method wherein the metal-containing water is at a pH of 8.5 to 9.5. Of course, skilled artisans will appreciate that, in the preferred method, the pH will depend on the metals desired to be removed. FIG. 1 describes the parameters skilled artisans would consider when optimizing the methods described herein.

The metal-containing water may flow through the filter at a velocity of 8 to 15 feet per second at a pressure of 20 to 100 pounds per square inch. In a preferred embodiment, the metal-containing water flows through the filter at a velocity of 10 to 11 feet per second at a pressure of 30 to 40 pounds per square inch.

The present invention is highly efficient at metal removal from metal-laden water. For all metals, 95% efficiency has been shown. In some instances, 98% efficiency or close to 100% efficiency has been shown.

In one aspect of the present invention, the metal(s) are removed from the metal-containing water using successive filters.

The present methods are functional at operating temperatures from 5° C. to 190° C. Operating temperatures from 18° C. to 25° C. are preferred, and an operating temperature of approximately 20° C. is most preferred.

Methods which further comprise at least one pass of water in a direction so as to dislodge metal buildup in said inorganic cross-flow filter are also provided. Preferred methods utilize pressures for such dislodging of metal buildup of 80 to 100 pounds per square inch in a direction so as to dislodge metal buildup in said inorganic cross-flow filter thereby maintaining a flow of purified water through the filter, said dislodging of metal buildup being conducted without interrupting the removal of metals from said metal containing water by the filter. Most preferred are methods wherein the pressure for dislodging buildup is approximately 90 pounds per square inch.

In all of the above embodiments, there is provided a method for removing metals from water, comprising passing metal-containing water through a ceramic cross-flow filter having an elemental membrane with an average pore size of 0.2 $\mu$m to 8 $\mu$m, wherein said metal-containing water flows through said filter at a velocity of 9 to 12 feet per second at a pressure of 30 to 60 pounds per square inch, and wherein said metal-containing water is at a pH of 8.0 to 10; and passing water so as to dislodge metal buildup in said ceramic cross-flow filter.

A method as in the paragraph directly above, wherein the operating temperature during filtration is 18 to 25° C., the efficiency is 95%, the metal(s) removed are aluminum, cadmium, chromium, cobalt, copper, gold, iron, lead, nickel, manganese, selenium, silver and zinc or which further comprises a programmable logic controller to semi-automate the method are preferred.

The filters for use in the present invention may be obtained from commercial sources. For example, ceramic filters may be obtained from Coors Ceramics Company, (800) 242-8021; 1100 Commerce Park Drive, Oak Ridge, Tenn. 37830. Other inorganic cross-flow filters may be obtained from U.S. Filter, Houston, Tex.

Figure 2:
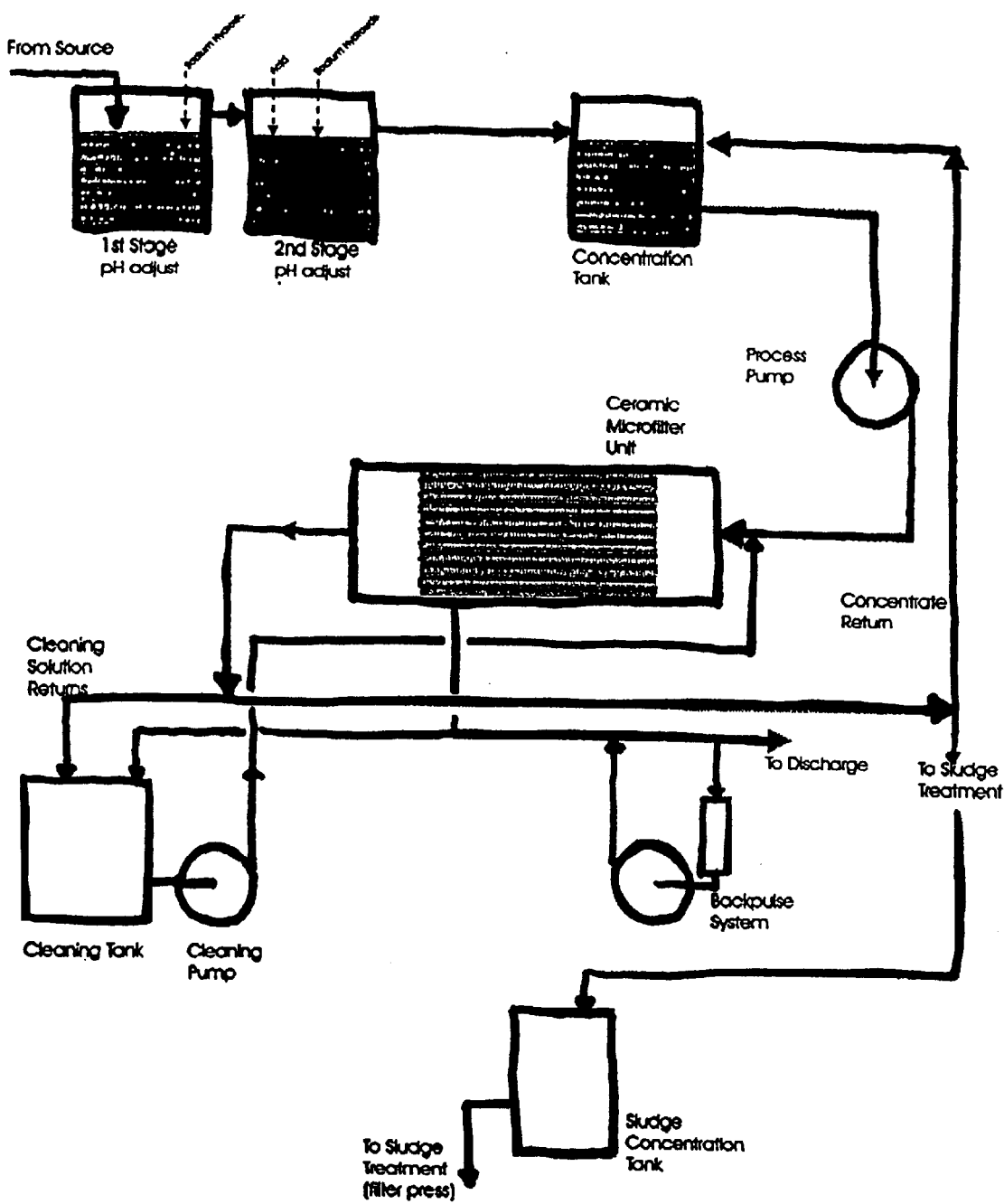
FIG. 2 is a schematic of a preferred embodiment of the methods of the present invention.

The present invention is functional using filters in a variety of configurations, depending on the location of the water from which metals will be removed. A conceptual drawing of the present methods is shown in FIG. 2. In that drawing, metal-containing water is subjected to a two stage pH adjustment system, in a rapid mix tank, where water is then passed through the inorganic membrane. The water is filtered and the clean water is discharged from the system. The clean water represents approximately 10% of the total flow. The remaining 90% of the metal-containing water is returned to the concentration tank for reprocessing. From the return line of the filter, a slip stream is sent to the sludge concentration tank. The sludge is handled as a solid at this point for further processing. This slip stream represents approximately 2% of the total flow.

Therefore, the present invention is directed to methods for treating liquid waste streams which contain metals, particularly heavy metals. The liquid waste streams can be, for example, mine tailing streams, waste streams from metal processing and manufacturing operations, or surface water sources for drinking water. In a preferred embodiment, the methods include adjusting the pH of the waste steam in order to precipitate metal hydroxides, carbonates or sulfides from the metals contained in the stream.

The pH of an incoming waste stream from mine tailings or metal finishing wastes is typically about pH 2 to 4. The pH is therefore preferably adjusted prior to filtration by adding a base, such as sodium hydroxide, sodium carbonate or ferrous sulfide. The pH is preferably adjusted to about 8 to 9 in order to precipitate hydroxides, carbonates or sulfides of the various metals of concern. Preferably, at least about 95% of the metals are converted to their respective hydroxides, carbonates or sulfides.

The pH is preferably adjusted in a mix tank and the pH-adjusted liquid stream is thereafter passed through an inorganic filter. The inorganic filter effectively removes the metal complexes from the waste stream. The inorganic filter is preferably a tubular ceramic filter which optionally includes an elemental membrane. The elemental membrane may contain, for example, 99.5% pure alumina. The ceramic filter advantageously have good strength which permits the use of high operating pressures and permits the filter element to withstand high back pressures for cleaning, as is described below. These ceramic filter elements also resist acidic or basic chemicals as well as hot water or steam, for cleaning purposes.

In a preferred embodiment, the apparatus utilizes a filtration module which includes a plurality of filter elements as described above. For example, in one embodiment, the module includes 24 alumina ceramic tubes 30 mm in diameter and 1 meter in length. Each filter element includes 12–20 channels having a diameter of 3.0 to 5.5 mm and the channels are coated with a ceramic membrane having a controlled average pore size. The filter elements are fixed in an elongate stainless steel housing using individual inserts and polymer gaskets, preferably high-temperature resistant gaskets such as fluorocarbon or EPDM gaskets. The module or modules operate in cross-flow mode with the permeate passing through the membrane and then the support and exiting through a permeate port in the housing. The retentate is recirculated through the primary entrance and exit ports of the module. A fourth port similar to the permeate port can be used for back pulsing to periodically clean the filter elements, as is described below. Multiple modules can be arranged in a series or parallel arrangement.

In carrying out the methods of the present invention, pulsing can advantageously be used to clear the membrane and maintain a high rate of flow through the filter. The stream is periodically forced backwards through the filter in order to clear the cake that can build up on the membrane and restrict the flow of waste stream therethrough. The waste stream is constantly recirculated in cross-flow. Optimally, the present method comprises a backpulse every 1 to 5 minutes, although backpulses could be indicated every 0.2 to 10 minutes, increments thereof, or variations thereon as well.

The system may optionally be controlled by a programmable logic controller (PLC) which automates pH adjustment, level control in tanks, pump operation and backpulse operation. Certain alarm conditions could shut down the system (for example a high turbidity condition) or change the mode of operation (for example from processing to recirculating). The controller could track operating conditions, such as meter readings, alarms and running times. The data could be downloaded to a remote station for evaluation. The controller could also be accessed remotely via telemetry (for example, telephone wires, radio waves or other means) for remote operation of the system. During remote operation, the operator could observe an animated representation of the system on a screen and operate the system.

EXAMPLES

Example 1

Removal of Metals Using Improved Method.

In order to demonstrate the effectiveness of the present invention, skid-mounted systems with 1 to 2 Au-10 modules were installed at three facilities on a full-scale basis, tested at numerous facilities on a pilot-scale basis, and compared to processes using conventional clarifiers and polymer membrane filters. An Au-10 module (which contains 24 filter elements) may be obtained from Coors Technical Ceramics Company, Tennessee Operations, 1100 Commerce Park Drive, Oak Ridge Tenn. 37830.

The three full-scale installations have all been operating since prior to April 1997. One is treating acid mine drainage, and two are treating metal finishing wastewater. All three systems operate satisfactorily, meeting discharge limits with minimal operator and chemical expenditures.

Pilot testing has been conducted with the present invention on more than a dozen waste and water streams. It has been conducted on different types of waste and water streams including: acid mine drainage, semiconductor manufacturing wastewater, potable water sources and metal finishing wastewater. Tables 1–4 summarize analytical results from four of the pilot tests conducted. As shown, removal efficiencies are either greater than 76 percent or to non-detectable concentrations of metals in the permeate, with the majority of removal efficiencies being greater than 90 percent.

TABLE 1

Example Of Metals Removal From Acid Mine Drainage Pilot Test Performed At Mount Emmons Mine, Crested Butte, Colorado

| Parameter | Concentration of Metals in Untreated Wastewater, mg/l | Concentration of Metals after Treating with this Technology, mg/l | Metal Removal Efficiency |
|---|---|---|---|
| Cadmium | 0.514 | 0.01 | 98.05% |
| Copper | 2.27 | 0.02 | 99.12% |
| Iron | 42.4 | 0.11 | 99.74% |
| Lead | 0.209 | 0.05 | 76.08% |
| Manganese | 44 | 0.02 | 99.95% |
| Zinc | 54 | 0.08 | 99.85% |

TABLE 2

Example Of Metals Removal From Semiconductor Manufacturing Wastewater Pilot Test Performed At Ramtron International, Colorado Springs, Colorado

| Parameter | Concentration of Metals in Untreated Wastewater, mg/l | Concentration of Metals after Treating with this Technology, mg/l | Metal Removal Efficiency |
|---|---|---|---|
| Cadmium | 0.012 | <0.01 | >16.67% |
| Chromium | 3.75 | <0.02 | >99.47% |
| Copper | 0.306 | <0.01 | >99.73% |
| Lead | 87 | <0.005 | >99.99% |
| Nickel | 0.066 | <0.02 | >69.70% |
| Silver | 0.057 | <0.01 | >82.46% |
| Zinc | 0.803 | <0.01 | >98.75% |

TABLE 3

Example Of Metals Removal From A Potable Water Source Pilot Test Performed At An Alluvial Aquifer Near Idaho Springs, Colorado

| Parameter | Concentration of Metals in Untreated Wastewater, mg/l | Concentration of Metals after Treating with this Technology, mg/l | Metal Removal Efficiency |
|---|---|---|---|
| Iron | 0.857 | 0.077 | 91.02% |
| Manganese | 1.63 | <0.01 | >99.39% |

TABLE 4

Example Of Metals Removal From Metal Finishing Wastewater Pilot Test Performed At Davis Wire, Pueblo, Colorado

| Parameter | Concentration of Metals in Untreated Wastewater, mg/l | Concentration of Metals after Treating with this Technology, mg/l | Metal Removal Efficiency |
|---|---|---|---|
| Cadmium | <0.01 | <0.01 | n/a |
| Chromium | 0.047 | <0.02 | >57.45% |
| Copper | 0.055 | <0.01 | >81.82% |
| Lead | 6.83 | <0.05 | >99.27% |
| Nickel | 0.036 | <0.02 | >44.44% |
| Silver | <0.01 | <0.02 | n/a |
| Zinc | 13.5 | 0.011 | 99.92% |

Example 2

Comparison of Improved Methods Over Known Methods.

The ceramic membrane filter treatment system was compared with a conventional clarifier system (coagulation, flocculation and sedimentation) and a polymeric membrane filter system.

Three different treatment systems were used to treat acid mine drainage from the aquifer in the Superfind area in Black Hawk. A clarifier system consisting of coagulation, flocculation and sedimentation was used to treat a 200 to 600 gpm mine drainage stream from a shaft in hydraulic communication with the groundwater. A polymeric membrane filtration system was used to treat groundwater from a building basement groundwater collection well; flow rate for this system was 10 gpm. A ceramic membrane filtration system replaced the polymeric unit after 15 months and treats the same waste stream. Both sources of groundwater (the mine shaft and the building basement collection well) are from the same aquifer and have the same chemical and physical characteristics. The cost data in this paper have been normalized to a 250 gpm sized system for side-by-side comparison.

Experimental Apparatus and Procedures

The experimental apparatus consisted of three different systems to treat the same type of water. In all three systems, there was performed a simple pH adjustment, from an in situ pH of 3 to 4, to a discharge pH of 7.5 to 11.0, with the higher pH values associated with the clarifier and the lower pH values associated with the membrane systems. By raising the pH to this level, we were able to precipitate the hydroxide of the various metals of concern.

The first system described is the general clarifier system (coagulation, flocculation and sedimentation). The system consisted of pH adjustment, followed by a flocculation zone in a rectangular clarifier, followed by sedimentation in the rectangular clarifier. This system was able to remove most of the heavy metals (approximately 70% to 80%) and handled a large acid mine drainage flow (200 to 600 gpm). This clarifier system requires a large land area in order to meet the required detention time for coagulation/flocculation/sedimentation.

The second system is a polymeric membrane filter. This system required only 10% of the total area and had significantly higher removal efficiencies (over 90% in most cases). However, after only three months of operation, the polymeric membranes became very "brittle." Once the membranes became brittle, they developed holes and were no longer functional. The flow rate for this system was 10 gpm. The operating pressures were 35 to 40 psi.

The third system is a ceramic membrane filter system developed by BASX Systems. This system has a pore size of 0.2 microns. The system was shown to have better operating characteristics than the previous two systems. The heavy metals removal was over 99% in most cases, and the operating costs decreased by over 30%. The flow rate for this system is 10 gpm, and the operating pressures are 35 to 40 psi.

Results and Discussion

The heavy metals of interest for this project were: Cadmium; Chromium; Copper; Iron; Lead; Manganese; and Zinc.

Table 5 provides the removal efficiencies for each system and parameter. As shown, the polymeric and ceramic membranes outperform the conventional system in terms of removal efficiencies.

Actual costs for each of these treatment systems are provided in Tables 6 and 7. The actual costs have been adjusted to represent a 250 gpm system in each case for a side-by-side comparison. As shown by this information, the best overall operational cost/performance results for treatment of acid mine drainage is provided by the ceramic membrane system.

The analysis provided in Tables 6 and 7 indicates that even after an owner had already invested in a conventional treatment system, a switch to the ceramic filtration system would result in about the same (or a little less) cost after 10 years that the owner would have incurred with the conventional system. In other words, the present value of the operating costs of the ceramic-based system, together with the capital investment, is lower than the present value of the operating costs of a conventional system.

Conclusions

1. The present methods provide a superior treated effluent when compared to the polymeric membrane or the conventional coagulation, flocculation and sedimentation treatment system.
2. The present methods allow longer operation between chemical cleanings than the polymeric membrane system; the ceramic membranes do not foul as quickly as the polymeric membranes.
3. There are significant cost savings in the treatment plant capital costs for the present methods when compared to conventional treatment.
4. There are significant cost savings in the operation of the present methods when compared to polymeric membranes or conventional treatment.

TABLE 5

Heavy Metal Removal Efficiencies

|  | PARAMETER | ESTIMATED REMOVAL | ACTUAL REMOVAL |
|---|---|---|---|
| Clarifier | Cadmium | 25% to 50% | 0% to 85% |
|  | Chromium | 25% to 50% | >99% |
|  | Lead | 70% to 95% | 90% to 95% |
|  | Manganese | 0% to 25% | 0% to 3% |
|  | Zinc | 25% to 50% | 0% to 90% |
| Polymeric Membrane | Cadmium | 25% to 50% | 85% to 95% |
|  | Chromium | 25% to 50% | >99% |
|  | Lead | 70% to 95% | >99% |
|  | Manganese | 0% to 25% | 50% to 80% |
|  | Zinc | 25% to 50% | 85% to 95% |
| Ceramic Membrane | Cadmium | 25% to 50% | 90% to >99% |
|  | Chromium | 25% to 50% | >99% |
|  | Lead | 70% to 95% | >99% |
|  | Manganese | 0% to 25% | 70% to 90% |
|  | Zinc | 25% to 50% | 90% to 95% |

TABLE 6

Comparative Capital Cost Analysis

| Item | Ceramic Filter System | Polymeric Filter System | Conventional Treatment (Coagulation /Flocculation Sedimentation) System |
|---|---|---|---|
| Estimated capital costs for a 250 gpm treatment plant | $1,900,000 | $1,800,000 | $4,200,000 |

TABLE 7

Comparative Annual Operating Cost Analysis

| Item | Ceramic Filter System | Polymeric Filter System | Conventional Treatment (Coagulation /Flocculation Sedimentation) System |
|---|---|---|---|
| General Building & Equipment Maintenance | $20,000 | $20,000 | $100,000 |
| Treatment Chemicals | $60,000 | $78,000 | $255,000 |
| Sludge Disposal | $20,000 | $20,000 | $25,000 |
| Operator Labor | $30,000 | $90,000 | $120,000 |
| Monitoring Costs | $18,000 | $18,000 | $18,000 |
| Power Costs for Pumping | $80,000 | $80,000 | $0 |
| Membrane Replacement | $0 | $100,000 | $0 |
| Contingency (15%) | $34,200 | $60,900 | $77,700 |
| Total Costs | $262,200 | $466,900 | $569,800 |
| Present Value of Annual Costs[1] | $1,611,105 | $2,868,898 | $3,660,319 |

Note 1: Calculated over a 10-year life of the system. The applicable discount rate is 10%.
Note 2: Actual capital and operating costs may vary widely depending upon site conditions and effluent stream requirements. However, the comparative costs among the treatment system should remain the same.

Although the present invention has been fully described herein, it is to be noted that various changes and modifications are apparent to those skilled in the art. Such changes and modifications are to be understood as included within the scope of the present invention as defined by the appended claims.

What is claimed is:

1. A method for efficiently and effectively removing metals from metal-containing water having at least one metal selected from the group consisting of aluminum, cadmium, chromium, copper, gold, iron, lead, nickel, manganese, selenium, silver and zinc comprising:

adjusting the pH of the metal-containing water to form metal-containing precipitates thereby removing at least about 95% of the metals and forming an intermediate metal-containing water stream;

subjecting the intermediate metal-containing water stream, said stream being at a temperature from approximately 5° C. to 190° C., to filtration with an inorganic cross-flow filter having an average pore size between from about 0.05 µm to 10 µm to remove additional metals and to form purified water; and periodically subjecting said inorganic cross-flow filter to a pulse of water at a pressure of approximately 80 to 100 psi in a direction so as to dislodge metal buildup in said inorganic cross-flow filter thereby maintaining the flow of purified water through the filter, said dislodging of metal buildup being conducted without interrupting the removal of metals from said intermediate metal-containing water stream by the filter.

2. A method of claim 1, wherein said inorganic cross-flow filter is a ceramic filter.

3. A method of claim 2, wherein said ceramic filter further comprises an elemental membrane.

4. A method of claim 1, wherein said metal-containing water is at a pH of 6 to 12.0.

5. A method of claim 4, wherein said metal containing water is at a pH of 8.0 to 10.

6. A method of claim 4, wherein said metal-containing water is at a pH of 8.5 to 9.5.

7. A method of claim 1, wherein said metal-containing water flows through said filter at a velocity of 8 to 15 feet per second at a pressure of 20 to 100 pounds per square inch.

8. A method of claim 7, wherein said metal-containing water flows through said filter at a velocity of 10 to 11 feet per second at a pressure of 30 to 40 pounds per square inch.

9. A method of claim 1, wherein said purified water contains less than 5% of the metal in the metal-containing water.

10. A method of claim 9, wherein said purified water contains less than 2% of the metal in the metal-containing water.

11. A method of claim 1, wherein said purified water contains less than 2% of the metal in the metal-containing water.

12. A method of claim 1, wherein said average pore size is from 0.2 μm to 5 μm.

13. A method of claim 1, which further comprises additional passes of said metal-containing water over one or more inorganic filters.

14. A method of claim 1, wherein operating temperature during filtration is from 18° C. to 25° C.

15. A method of claim 1, wherein operating temperature during filtration is approximately 20° C.

16. A method of claim 1, wherein said pulse of water passed in a direction so as to dislodge metal buildup is at a pressure of approximately 90 pounds per square inch.

17. The method of claim 1 wherein said periodically subjecting said inorganic cross-flow filter to a pulse of water occurs at intervals of approximately 0.2 to 10 minutes.

18. The method of claim 1 wherein said periodically subjecting said inorganic cross-flow filter to a pulse of water occurs at intervals of approximately 1 to 5 minutes.

19. The method of claim 1 wherein said metal-containing water is selected from the group consisting of mine tailing streams, waste streams from metal processing and manufacturing operations and surface water sources for drinking water.

20. A method for efficiently and effectively removing metals from metal-containing water selected from the group of mine tailings and waste streams from metal processing and manufacturing operations and having at least one metal selected from the group consisting of aluminum, cadmium, chromium, copper, gold, iron, lead, nickel, manganese, selenium, silver and zinc comprising:

adjusting the pH of the metal-containing water to form metal-containing precipitates thereby removing a portion of the metals and forming an intermediate metal-containing water stream;

subjecting the intermediate metal-containing water stream, said stream being at a temperature from approximately 5° C. to 190° C., to filtration with a inorganic cross-flow filter having an average pore size between from about 0.05 μm to 10 μm to remove additional metals and to form purified water; and periodically subjecting said inorganic cross-flow filter to a pulse of water in a direction and at a pressure so as to dislodge metal buildup in said inorganic cross-flow filter thereby maintaining the flow of purified water through the filter, said dislodging of metal buildup being conducted without interrupting the removal of metals from said intermediate metal-containing water stream by the filter.

21. A method of claim 20, wherein said inorganic cross-flow filter is a ceramic filter.

22. A method of claim 21, wherein said ceramic filter further comprises an elemental membrane.

23. A method of claim 22, wherein said average pore size is from 0.2 μm to 5 μm.

24. A method of claim 20, wherein said metal-containing water is at a pH of 6 to 12.0.

25. A method of claim 24, wherein said metal containing water is at a pH of 8.0 to 10.

26. A method of claim 24, wherein said metal-containing water is at a pH of 8.5 to 9.5.

27. A method of claim 20, wherein said metal-containing water flows through said filter at a velocity of 8 to 15 feet per second at a pressure of 20 to 100 pounds per square inch.

28. A method of claim 27, wherein said metal-containing water flows through said filter at a velocity of 10 to 11 feet per second at a pressure of 30 to 40 pounds per square inch.

29. A method of claim 20, wherein said purified water contains less than 5% of the metal in the metal-containing water.

30. A method of claim 11, wherein said purified water is essentially free from the metal in the metal-containing water.

31. A method of claim 20, which further comprises additional passes of said metal-containing water over one or more inorganic filters.

32. A method of claim 20, wherein operating temperature during filtration is from 18° C. to 25° C.

33. A method of claim 20, wherein operating temperature during filtration is approximately 20° C.

34. The method of claim 20 wherein said periodically subjecting said inorganic cross-flow filter to a pulse of water occurs at intervals of approximately 0.2 to 10 minutes.

35. The method of claim 20 wherein said periodically subjecting said inorganic cross-flow filter to a pulse of water occurs at intervals of approximately 1 to 5 minutes.

36. The method of claim 20 wherein said metal-containing water is selected from the group consisting of mine tailing streams, waste streams from metal processing and manufacturing operations and surface water sources for drinking water.

* * * * *